May 26, 1925.
C. E. LEEMAN
ILLUMINATED HUB CAP
Filed Oct. 24, 1923
1,539,394
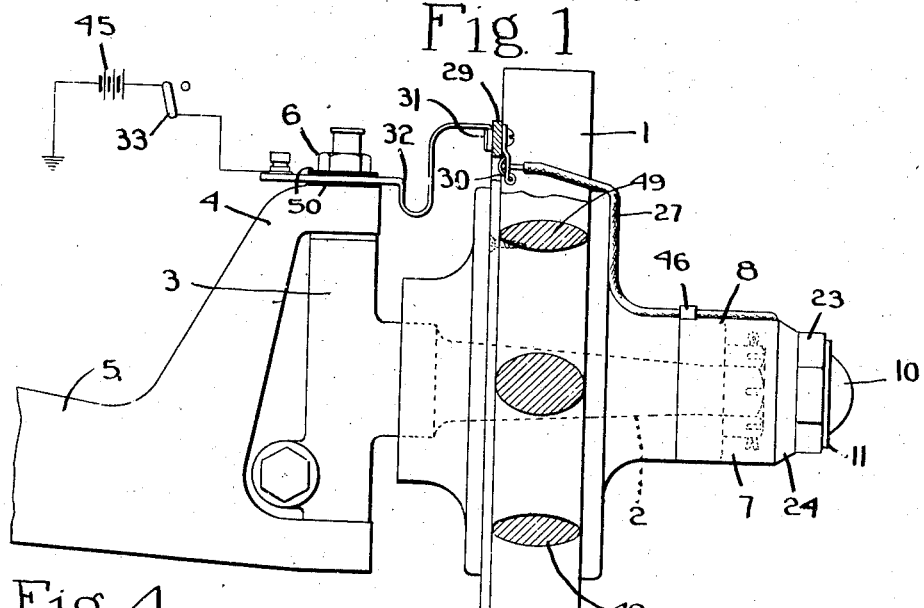
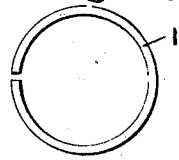
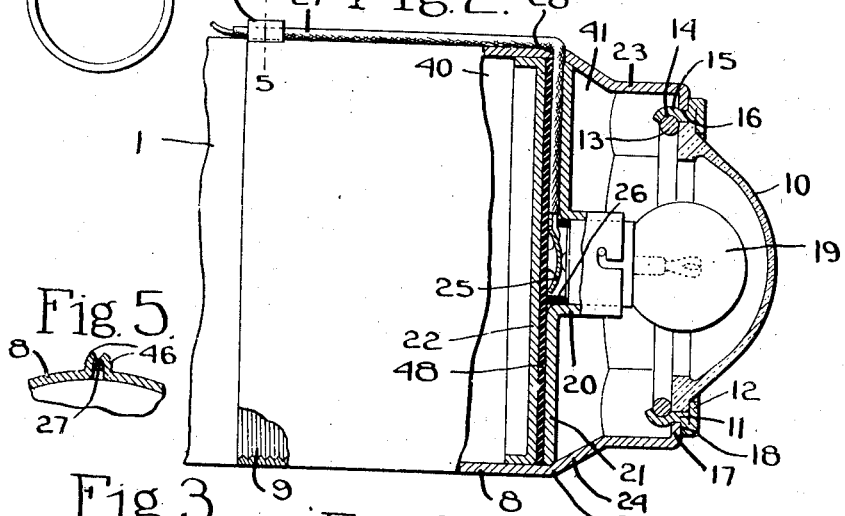
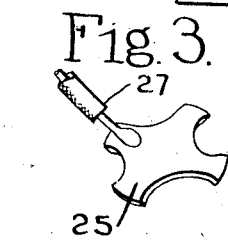
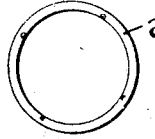
Inventor.
Charles E. Leeman
by Heard Smith Newman
Attys.

Patented May 26, 1925.

1,539,394

UNITED STATES PATENT OFFICE.

CHARLES E. LEEMAN, OF BOSTON, MASSACHUSETTS, ASSIGNOR TO WILLIAM F. GAFFNEY AND JOHN V. WEIS, BOTH OF ALBANY, NEW YORK.

ILLUMINATED HUB CAP.

Application filed October 24, 1923. Serial No. 670,608.

*To all whom it may concern:*

Be it known that I, CHARLES E. LEEMAN, a citizen of the United States, and resident of Boston, county of Suffolk, State of Massachusetts, have invented an Improvement in Illuminated Hub Caps, of which the following description, in connection with the accompanying drawing, is a specification, like characters on the drawing representing like parts.

One of the difficulties involved in driving an automobile at night is that it is often difficult for the driver of an automobile to know how much clearance space he has or should allow in passing another automobile. The headlights of the on-coming automobile give an indication as to the amount of probable clearance space the driver may have but if the roadway is narrow and it is necessary to pass close to the on-coming automobile it is extremely difficult under ordinary circumstances for the driver of a machine to determine the exact limits of the left hand side of the on-coming automobile. This is specially true if the left hand headlight of the on-coming automobile is not lighted, an occurrence which not infrequently happens. Under these conditions the headlight of the on-coming automobile gives no proper indication as to its position in the roadway.

One of the objects of my present invention is to provide a novel illuminated hub cap which is designed for use on the left hand front wheel of the automobile and which is constructed so that when illuminated it can be seen from in front of the automobile. With this equipment the driver of an automobile can accurately ascertain the position transversely of the roadway of the hub cap of the left front wheel of the on-coming automobile and as the hub caps of the front wheels are usually about in line with the outer edges of the fenders, this construction will provide means whereby an automobile driver can accurately determine the position of the left hand edge of the running board of an on-coming automobile and can thus make sure of passing the automobile in safety without danger of collision.

A hub cap embodying my invention may be provided with a metal body adapted to screw onto the hub of the wheel in the usual manner and it is also provided in its outer end with a lamp-receiving chamber, the outer portion of which is formed of some transparent or translucent material, such for instance, as red glass. The shape of the translucent portion of the hub cap is such that it extends beyond the metal portion which is opaque and the lamp is so situated within the lamp chamber that when it is lighted the light rays will be thrown not only laterally but also forwardly and rearwardly so that the illuminated hub cap can be seen from both in front and in rear of the automobile.

Inasmuch as the front hub caps of automobiles are usually filled with grease for lubricating the bearings of the front wheel I have provided a hub cap construction which is provided with a partition separating the grease-receiving chamber from the lamp chamber so that the lamp socket and lamp will be kept free from grease while the hub cap can still perform its usual function of providing a reservoir of grease for the bearings of the front wheel. Suitable circuit connections are employed whereby the hub cap can be illuminated at the will of the operator.

In order to give an understanding of my invention I have illustrated in the drawings a selected embodiment thereof which will now be described after which the novel features will be pointed out in the appended claims.

In the drawings:

Fig. 1 is a view of the front wheel assembly of an automobile showing my improvements applied thereto;

Fig. 2 is an enlarged sectional view through my improved hub cap;

Fig. 3 is a perspective view of the contact for the bulb;

Fig. 4 is a view of the split ring for holding the glass 10 in place;

Fig. 5 is a section on the line 5—5, Fig. 2;

Fig. 6 is a view on a reduced scale of the contact ring 29.

In the drawings 1 indicates the left hand front wheel of an automobile, it being mounted on the usual spindle 2, the body 3 of which is connected to the forked end 4 of the front axle 5 by means of the usual spindle bolt 6.

My improved hub cap is shown at 7 and it comprises a metal body portion 8 adapted to engage a screw-threaded portion 9 of the wheel hub as usual. In my improved hub cap the outer end thereof is made of some transparent or some translucent material, such transparent or translucent portion extending beyond the metal portion which is opaque. Situated within the hub cap adjacent the transparent or translucent end is an electric light bulb which is so situated that when it is lighted the light thereof will shine through the translucent or transparent portion, the shape of the translucent portion being such that the illuminated end of the hub cap can be seen from directly in front of or in the rear of the car.

Such translucent or transparent end of the hub cap may be provided for in various ways. As one practical structure I have illustrated a construction by which the end of the hub cap is formed by a concavo-convex transparent or translucent member 10 preferably of red or other colored glass, such member 10 preferably being detachably secured to the hub cap. In the construction herein shown this member 10 is carried by a supporting ring 11 which is detachably retained in the outer end of the metal portion 8, the latter having an inwardly-directed flange 17 surrounding an opening 16 of a size to receive the member 11. This supporting ring is shown as having an inwardly-directed flange 12 against which the periphery of the glass 10 rests and said glass is held in place by a split spring retaining ring 13, which fits into a groove 14 formed in the flange portion 15 of the supporting ring. This flange portion is made slightly convex on its exterior and is constructed so that it can be forced into the opening 16 in the end of the metal body. There is enough resiliency in the flange 15 so that the latter will contract slightly as it is inserted into the open end of the hub cap body, said flange expanding after passing the flange 17 thus retaining the supporting ring in place with the shoulder 18 resting against the flange 17 of the metal body portion 8.

19 indicates an electric light bulb which is preferably situated adjacent the glass or lens 10. This bulb is carried by a socket member 20 that is herein shown as formed on a supporting disk 21 that is retained in the metal portion 8 of the hub cap, and suitable means are provided, as will hereinafter be described, by which the bulb may be either lighted or turned off.

Inasmuch as the hub caps of the front wheels of an automobile have the function of grease cups in that they are usually filled with grease for the purpose of supplying lubrication to the bearing of the front wheels, I propose to make my improved hub cap with a dividing partition which divides the interior thereof into two chambers 40 and 41, one of which constitutes the grease-receiving chamber and the other of which constitutes the bulb-receiving chamber. The partition which is used for this purpose is indicated at 22 and it may be in the form of a disk having a peripheral flange which is of a size to be forced into the interior of the hub cap. Said partition may be retained in place either by friction or by being brazed to the metal portion 8 or in any other suitable way.

In the form of hub cap herein shown the metal portion 8 is reduced somewhat at its outer end as shown at 23, such reduced portion being flat sided and furnishing a wrench-receiving portion for screwing the hub cap to the hub or removing it therefrom. This forms an inclined portion 24 and in the present construction the periphery of the supporting disk 21 rests against this inclined portion 24 and is held in position by the partition 22. The method of wiring for lighting the bulb will depend something on whether the bulb is a single-point contact bulb or a double-point contact bulb.

In the construction shown the single-point contact variety is used, the bulb being grounded through the socket 20 and the hub cap. The center terminal of the bulb engages a spring contact member 25 having a concavo-convex shape in order to provide a certain degree of resiliency and supported centrally of the socket 21. This contact member is suitably insulated from the hub cap by means of a disk 48 of insulating material situated between the partition 22 and the disk 21 and an insulating ring 26 which sets within the socket member 20 and encircles the contact 25. Said contact 25 has connected thereto a circuit wire 27 which extends between the insulating disk 48 and the socket-supporting disk 21 which also passes through an opening 28 in the metal body 8. This circuit wire extends along the periphery of the hub cap and the exterior of the hub and through the spokes 49 of the wheel, said wire being detachably connected to a contact ring 29 that is rigidly secured to the interior of the wheel. The hub cap may preferably have retaining ears 46 struck up therefrom which partially embrace the wire 27 and thus retain it in position in close contact with the hub.

The connection between the circuit wire 27 and the contact ring 29 will preferably be a detachable one as shown at 30 so that the wire can be readily disconnected from the contact ring when it is necessary to remove the hub cap for any purpose.

A brush 31 which is electrically connected to the battery 45 or other source of electricity through a suitable switch 33, engages the contact ring 29, the ring providing a continuous electrical connection between the brush 31 and the circuit wire 27 notwithstanding the rotation of the wheel. The brush 31 may be supported in any suitable way without departing from the invention. One convenient way is to secure it to the forked end 4 of the axle by means of the usual spindle bolt 6. The end of the brush may be provided with an aperture through which the spindle bolt extends and the brush may be retained in place by being clamped between the head of the spindle bolt and the forked portion of the axle as shown in the drawings, it being understood that the brush should be properly insulated from the axle as shown at 50.

The shank 32 of the brush is made resilient so that the brush will be yieldingly held against the contact ring 29 and this allows for turning or steering movement of the front wheel without breaking the electrical connection between the brush and the contact ring. This brush may be supported in any other suitable way without departing from the invention.

It will be observed from the above description that when the switch 33 is closed the bulb 19 will be lighted and as the light-transmitting portion of the hub cap extends beyond the opaque portion the light rays will be directed forwardly and rearwardly as well as laterally. Consequently the illuminated end of the hub cap may be seen from in front of the automobile.

An automobile equipped with my invention and having the hub cap illuminated gives a clear indication to any automobile which it passes as to the exact location of the hub of the left front wheel and consequently as to the exact location of the edge of the running board and fenders. The dangers of night driving are thus greatly reduced as when any two automobiles pass they can readily see just how much clearance space they have for this purpose.

Another advantage of my invention is that its use does not in any way interfere with the use of the hub cap as a reservoir for grease and the presence of the grease in the grease-receiving chamber 40 does not interfere at all with the use of the lamp nor the operation of replacing burnt-out bulbs.

While I have illustrated herein a selected embodiment of my invention I do not wish to be limited to the constructional features shown.

I would also desire to state that while I have described the invention as applied to the left front wheel of the automobile, yet I wish it understood that the invention may be applied to any one of the four hub caps of an automobile without in any way departing from the invention.

I claim:

1. In an automobile, the combination with a front wheel, of a hub cap therefor having an end of light-transmitting material, a bulb within the hub cap, a contact ring secured to the wheel, a wire connection between said contact ring and the bulb and a brush carried by the frame of the automobile and engaging said contact ring.

2. An illuminating hub cap for an automotive vehicle comprising a metal body portion adapted to be screw-threaded to the wheel hub, a partition within the hub cap, a disc of insulating material adjacent the outer side of said partition, a lamp socket, a support for said socket, a spring contact member resting against said disc in operative position with respect to the socket, means carried by the hub cap for transmitting light from a lamp placed in said socket, and means for carrying current to said lamp via said spring contact.

3. An illuminating hub cap for an automotive vehicle comprising a metal body portion adapted to be screw-threaded to the wheel hub, said body portion having an inclined part terminating with preferably flat sides, a support resting against said inclined part of the cap, a member of insulating material next to the support, a partition adjacent said insulating member, a lamp socket centrally mounted on said support, an annular ring of insulating material within the base of the socket, a resilient contact member positioned by said ring against said member of insulating material, means carried by the hub cap for transmitting light from a lamp placed in said socket, and means for carrying current to said lamp via said spring contact.

4. An illuminating hub cap for an automotive vehicle comprising a metal body portion adapted to be screw-threaded to the wheel hub, said body portion having a reduced outer end terminating in a radially projecting flange, a supporting ring carrying a light transmitting member, said ring having an inwardly projecting curved flange adapted to be passed through the flange opening on the cap, a snap ring for engaging the inner periphery of said support ring flange to hold the light transmitting member in place, a partition fixed within the hub cap near the beginning of the reduced portion, a lamp and socket mounted adjacent the partition and means for conveying current to the lamp.

5. An illuminating hub cap for an automotive vehicle comprising a metal body portion adapted to be screw-threaded to the wheel hub, said body portion having a reduced outer end terminating in a radially projecting flange, a supporting ring carrying a light transmitting member, said ring having an inwardly projecting curved flange adapted to be passed through the flange opening on the cap, a snap ring for engaging the inner periphery of said support ring flange to hold the light transmitting member in place, a partition fixed within the hub cap near the beginning of the reduced portion, a support for a lamp socket resting against said reduced portion of the cap, a disc of insulating material between said lamp socket support and the partition, a resilient contact member positioned against said disc, means for insulating said contact member from the socket support and means for conveying current to said contact and to a lamp adapted to be mounted in said socket.

In testimony whereof, I have signed my name to this specification.

CHARLES E. LEEMAN.